US 7,702,907 B2
Apr. 20, 2010

(12) United States Patent
Vaha-Sipila et al.

(10) Patent No.: US 7,702,907 B2
(45) Date of Patent: Apr. 20, 2010

(54) SYSTEM AND METHOD FOR SAFE BOOTING ELECTRONIC DEVICES

(75) Inventors: Antti Vaha-Sipila, Helsinki (FI); Lauri Paatero, Helsinki (FI); Matti Parnanen, Tampere (FI)

(73) Assignee: Nokia Corporation, Espoo (FI)

(*) Notice: Subject to any disclaimer, the term of this patent is extended or adjusted under 35 U.S.C. 154(b) by 1433 days.

(21) Appl. No.: 10/956,421

(22) Filed: Oct. 1, 2004

(65) Prior Publication Data
US 2006/0075216 A1 Apr. 6, 2006

(51) Int. Cl.
*H04L 29/06* (2006.01)

(52) U.S. Cl. .......................................... 713/166; 726/3

(58) Field of Classification Search ......... 713/164–166, 713/191; 726/3
See application file for complete search history.

(56) References Cited

U.S. PATENT DOCUMENTS

| | | | | |
|---|---|---|---|---|
| 4,411,017 A | * | 10/1983 | Talbot | 380/31 |
| 5,349,643 A | * | 9/1994 | Cox et al. | 713/155 |
| 5,465,300 A | * | 11/1995 | Altschuler et al. | 380/30 |
| 5,615,266 A | * | 3/1997 | Altschuler et al. | 713/162 |
| 5,694,222 A | * | 12/1997 | Yamada | 358/296 |
| 5,826,015 A | * | 10/1998 | Schmidt | 726/23 |
| 5,859,911 A | * | 1/1999 | Angelo et al. | 713/187 |
| 5,937,063 A | * | 8/1999 | Davis | 713/187 |
| 6,009,524 A | * | 12/1999 | Olarig et al. | 726/10 |
| 6,101,608 A | * | 8/2000 | Schmidt et al. | 726/2 |
| 6,185,678 B1 | * | 2/2001 | Arbaugh et al. | 713/2 |
| 6,275,141 B1 | * | 8/2001 | Walter | 340/5.64 |
| 6,320,514 B1 | * | 11/2001 | Flick | 340/825.69 |
| 6,385,737 B1 | * | 5/2002 | Benignus et al. | 714/22 |
| 6,640,316 B1 | | 10/2003 | Martin et al. | |
| 6,662,023 B1 | * | 12/2003 | Helle | 455/558 |
| 6,684,326 B1 | * | 1/2004 | Cromer et al. | 713/2 |
| 7,000,249 B2 | * | 2/2006 | Lee | 726/20 |
| 7,003,676 B1 | * | 2/2006 | Weber et al. | 713/194 |
| 7,007,300 B1 | * | 2/2006 | Weber et al. | 726/21 |
| 7,043,581 B1 | * | 5/2006 | Gulick | 710/240 |
| 7,043,697 B1 | * | 5/2006 | Jensen et al. | 715/788 |
| 7,065,654 B1 | * | 6/2006 | Gulick et al. | 713/193 |
| 7,149,854 B2 | * | 12/2006 | Weber et al. | 711/152 |
| 7,191,464 B2 | * | 3/2007 | Cromer et al. | 726/2 |

(Continued)

FOREIGN PATENT DOCUMENTS

WO WO 2004/040881 5/2004

OTHER PUBLICATIONS

Nokia Activ Server 2.0, Nokia Activ Server Professional Edition, Product Data Sheet May 2001.

(Continued)

*Primary Examiner*—David Garcia Cervetti
(74) *Attorney, Agent, or Firm*—Banner & Witcoff, Ltd.

(57) ABSTRACT

An improved system and method for safe booting an electronic device. In situations such as where a virus is infecting various devices within a network, the present invention provides an authentication centre with the ability to instruct a device on the network to safe boot. During the safe boot, it can be arranged such that no third party applications are run, only backup, restoration, or uninstallation of programs are possible, and/or only programs in the device's read-only memory are loaded. The present invention also provides a user with the ability to go through the boot process in a step-by-step manner.

37 Claims, 9 Drawing Sheets

Boot Sequence

U.S. PATENT DOCUMENTS

| | | | | |
|---|---|---|---|---|
| 7,216,362 | B1* | 5/2007 | Strongin et al. | 726/16 |
| 7,299,037 | B2* | 11/2007 | Hospes | 455/419 |
| 7,299,354 | B2* | 11/2007 | Khanna et al. | 713/165 |
| 7,313,690 | B2* | 12/2007 | Miller | 713/155 |
| 7,360,073 | B1* | 4/2008 | Billstrom et al. | 713/2 |
| 7,370,189 | B2* | 5/2008 | Fischer et al. | 713/2 |
| 7,376,968 | B2* | 5/2008 | Ritz et al. | 726/17 |
| 2001/0020251 | A1* | 9/2001 | Sheikh et al. | 709/224 |
| 2001/0052069 | A1 | 12/2001 | Sekiguchi | |
| 2003/0018892 | A1* | 1/2003 | Tello | 713/164 |
| 2003/0041248 | A1* | 2/2003 | Weber et al. | 713/182 |
| 2003/0056107 | A1 | 3/2003 | Cammack et al. | |
| 2003/0074548 | A1* | 4/2003 | Cromer et al. | 713/1 |
| 2003/0084307 | A1* | 5/2003 | Schwartz | 713/189 |
| 2003/0084342 | A1* | 5/2003 | Girard | 713/201 |
| 2004/0064457 | A1* | 4/2004 | Zimmer et al. | 707/100 |
| 2004/0158742 | A1* | 8/2004 | Srinivasan et al. | 713/201 |
| 2004/0203601 | A1* | 10/2004 | Morriss et al. | 455/411 |
| 2005/0005096 | A1* | 1/2005 | Miller | 713/155 |
| 2005/0071677 | A1* | 3/2005 | Khanna et al. | 713/201 |
| 2005/0111664 | A1* | 5/2005 | Ritz et al. | 380/255 |
| 2005/0132217 | A1* | 6/2005 | Srinivasan et al. | 713/200 |
| 2005/0149729 | A1* | 7/2005 | Zimmer et al. | 713/168 |
| 2005/0204155 | A1* | 9/2005 | Ravi et al. | 713/200 |
| 2005/0228980 | A1* | 10/2005 | Brokish et al. | 713/2 |
| 2006/0015748 | A1* | 1/2006 | Goto et al. | 713/190 |
| 2006/0069903 | A1* | 3/2006 | Fischer et al. | 713/1 |
| 2006/0129848 | A1* | 6/2006 | Paksoy et al. | 713/193 |
| 2007/0022243 | A1* | 1/2007 | Rudelic | 711/103 |
| 2007/0083760 | A1* | 4/2007 | Cho et al. | 713/168 |
| 2007/0113088 | A1* | 5/2007 | Volp | 713/169 |

OTHER PUBLICATIONS

Michael Kain, "Push Proxy Gateway (PPG) Information Manual", Dec. 29, 2004.

* cited by examiner

Symbian SW Base Boot

SYSTEM AND METHOD FOR SAFE BOOTING ELECTRONIC DEVICES

FIELD OF THE INVENTION

The present invention relates generally to mobile electronic devices. More particularly, the present invention relates to mobile electronic devices including a "safe boot" where only ROM-based, factory-installed, or trusted software is loaded during the startup process.

BACKGROUND OF THE INVENTION

Open platform devices such as mobile telephones, personal computers and personal digital assistants include large amounts of software. In many instances, some of the individual software programs may be malicious and/or do not behave satisfactorily with other software programs on the device. In the case of a virus or a propagating Trojan horse (worm) attack, virus killing programs may not react quickly enough to prevent the malicious entity from contaminating other programs and/or any data on the device. Furthermore, in devices such as mobile telephones, there may not be any virus killing programs installed at all.

Virus killers have recently been implemented on open mobile phone platforms. These programs, however, require a network connection in order to update their virus databases. Although platform security enhancements help to reduce worm and virus threats, they cannot completely eliminate them. In any event, it is extremely important for the device to be capable of halting the propagation of harmful software from the devices extremely quickly.

Various safe-boot systems currently exist for allowing a device to start up in a "safe" mode. In a safe boot, the end user is given the opportunity to go step-by-step through the boot process. This is often initiated by actuating a certain key, such as a "function" key on a personal computer.

One system for implementing a safe boot is described in U.S. Pat. No. 6,640,316, issued on Oct. 28, 2003 and incorporated herein by reference. In this system, the contents of a diagnostics indicator are evaluated to determine whether the indicator contains a "simple boot" value. In at least one embodiment, the "simple boot" value is equivalent to a "set" state. The method includes determining, if the diagnostics value is set, whether a platform corruption has occurred. If the simple boot flag is set and a platform corruption has not occurred, then a simple boot is performed. Otherwise (i.e., either the simple boot flag is not set or a platform corruption has occurred, or both) one or more diagnostic routines are executed.

In many Symbian telephones and other conventional systems, a safe boot can be conducted by loading only programs stored in the devices read-only memory (ROM) or other software whose trustworthiness can be assured by other methods. However, the decision whether to load programs from the device's ROM is based on self-diagnostics and is not dependent on any external commands. Furthermore, a mobile phone may reach a condition where it can no longer boot properly due to user data failure.

SUMMARY OF THE INVENTION

The present invention permits a network within which a mobile device is located to instruct the mobile device to start up in a safe mode in which no third party programs can be run, and/or wherein only the backup, restoration and uninstallation of programs are possible, and/or in which no third party software is started in the boot process. The present invention also provides for an operator-initiated safe-boot, wherein the user can actuate one of several "triggers" to begin the safe-boot process.

The present invention provides for a number of advantages for mobile devices, such as mobile telephones, over the prior art. For example, with the present invention it can be virtually ensured that the device always boots up, because ROM-based software is nearly always bootable. The end user can also address and solve problems in the device without having to take the device to an after-sales service point for maintenance. Additionally, the present invention provides all of the devices on a network with the ability to be informed of when a safe boot may be necessary. The present invention can also be incorporated into virtually any type of electronic device that communicates within a network.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention provides a network within which a mobile device is located with the ability to instruct the mobile device to start up in a safe mode, in which no third party programs can be run, or only backup, restore and uninstallation of programs are possible, or in which no third party software is started in the boot time.

Figure 1:
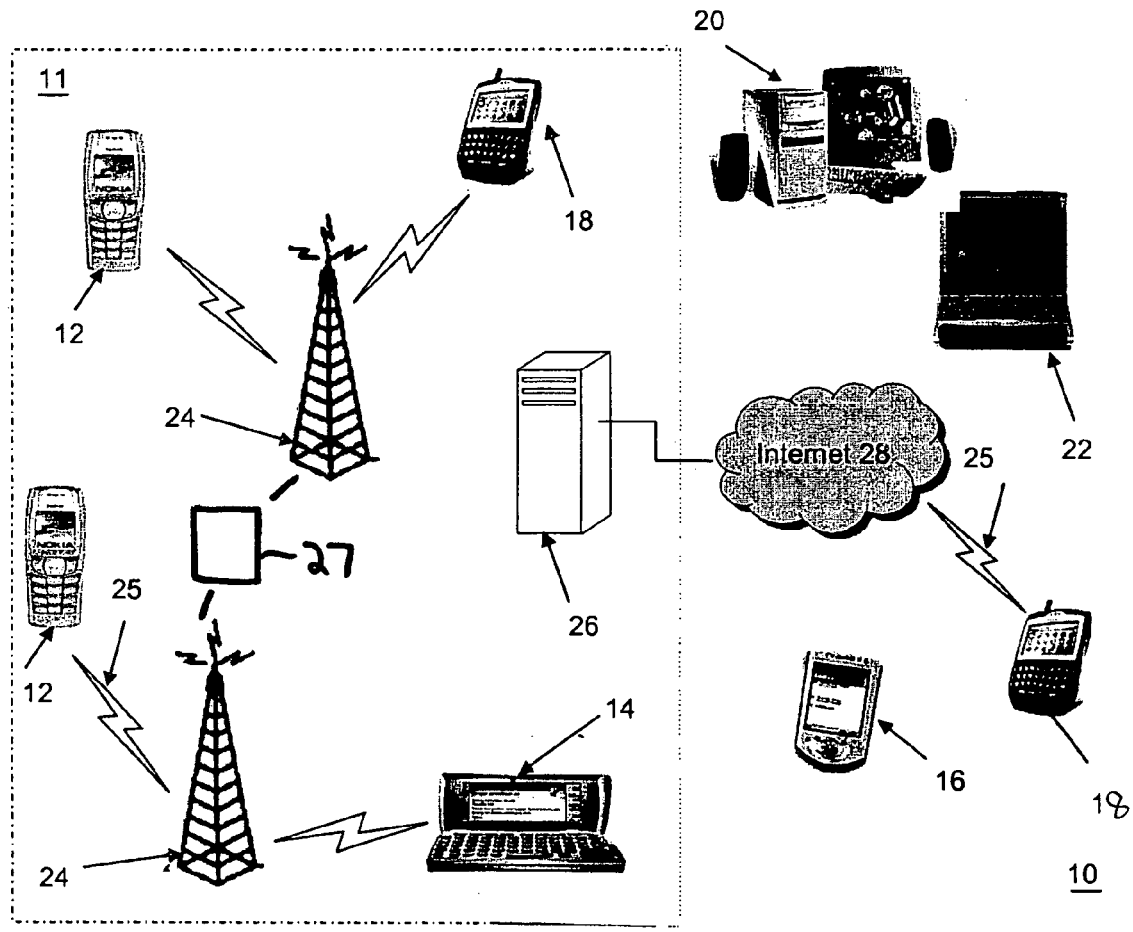
FIG. 1 is an overview diagram of a system according to the present invention.

FIG. 1 shows an exemplary system 10 in which the present invention can be utilized, comprising multiple communication devices that can communicate through a network. The system 10 may comprise any combination of wired or wireless networks including, but not limited to, a mobile telephone network, a wireless Local Area Network (WLAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28.

Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a mobile telephone 12, a combination PDA and mobile telephone 14, a PDA 16, an IMD 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
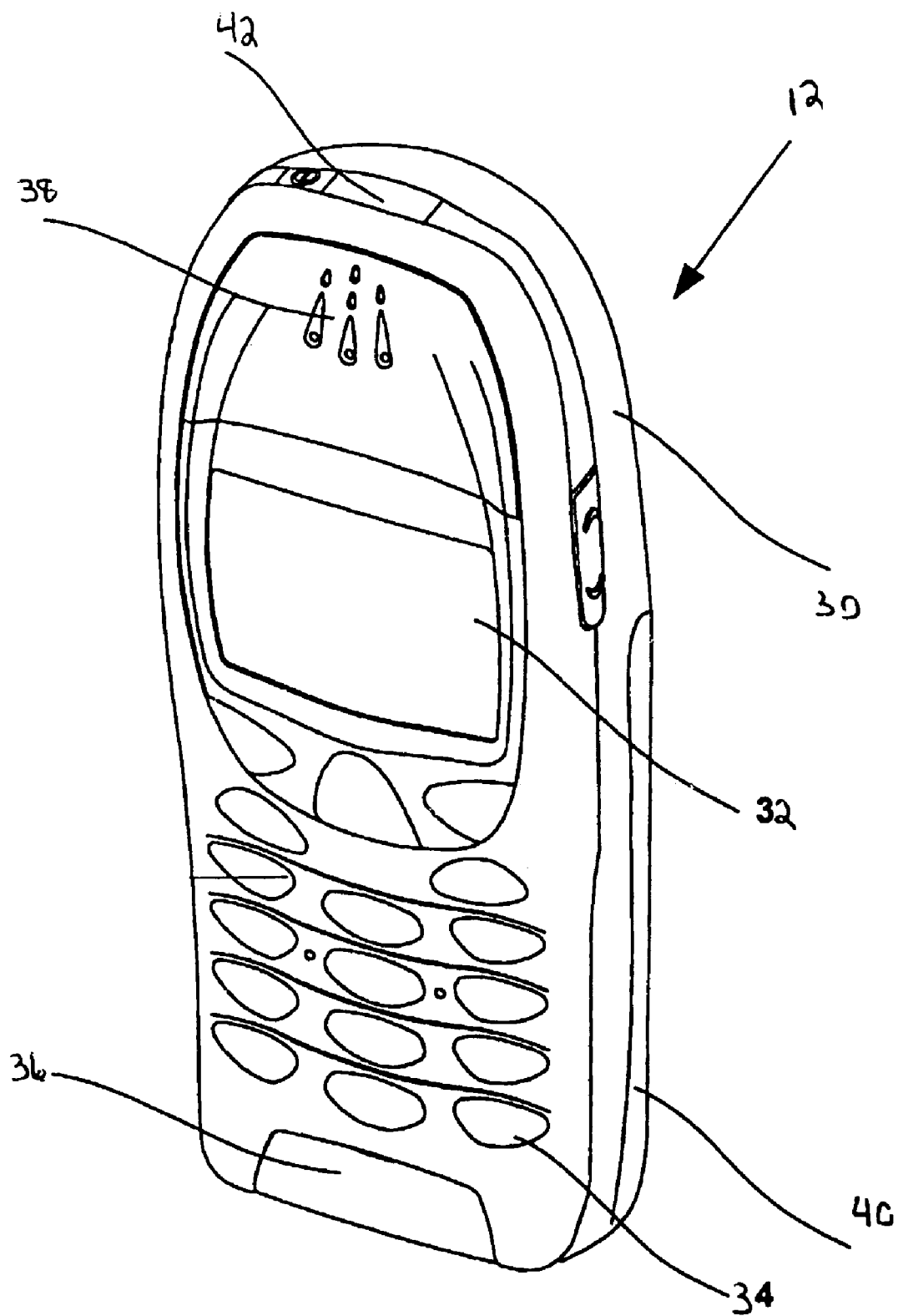
FIG. 2 is a perspective view of a mobile telephone that can be used in the implementation of the present invention.
Figure 3:
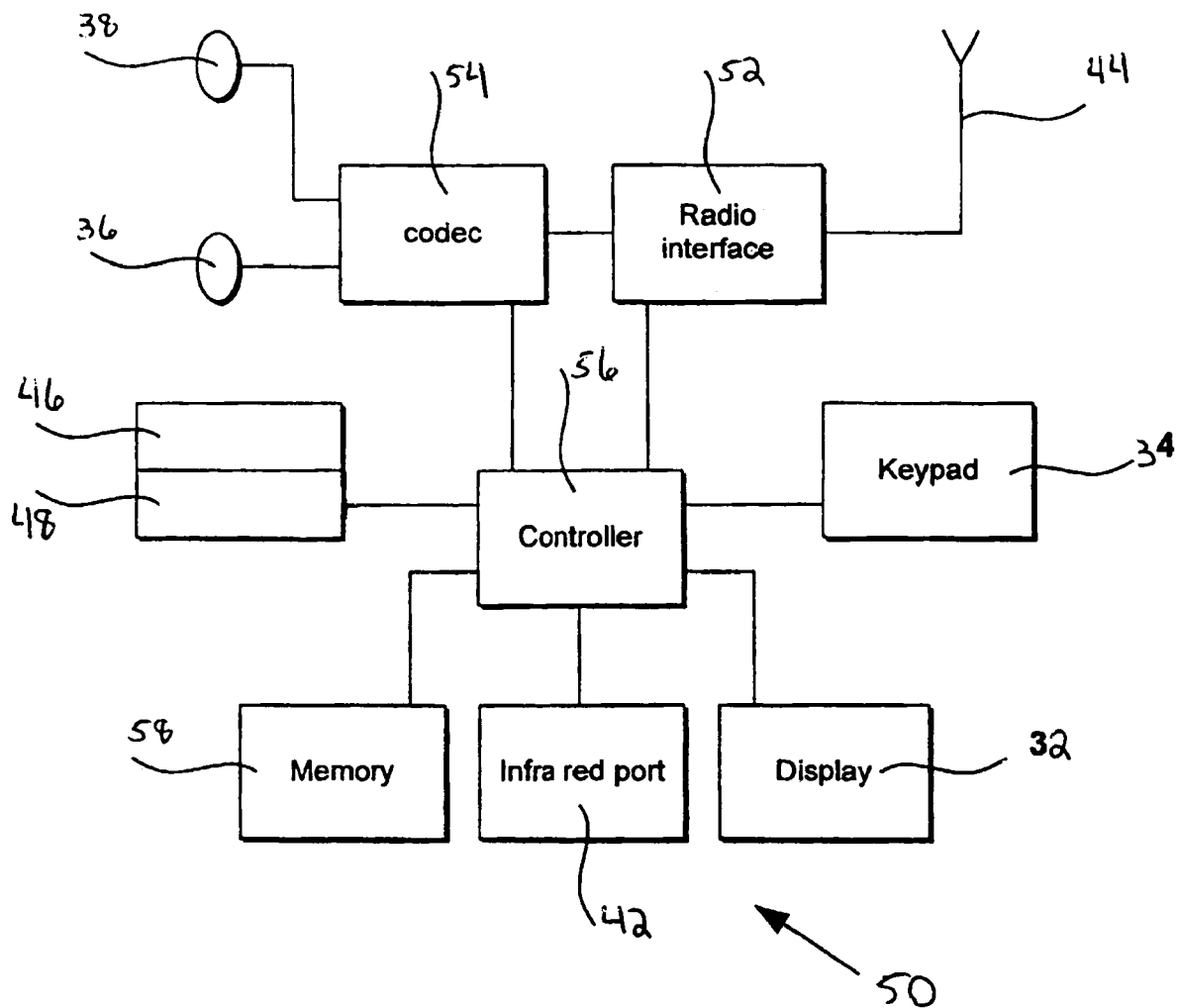
FIG. 3 is a schematic representation of the telephone circuitry of the mobile telephone of FIG. 2.

FIGS. 2 and 3 show one representative mobile telephone 12 according to one embodiment of the invention. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, a communication link 42 (for example, in the form of an infrared port), an antenna 44, a smart card 46 in the form of a universal integrated circuit card (UICC) according to one embodiment of the invention, a card reader 48, and mobile telephone circuitry 50. In addition to the above, the mobile telephone 12 can include a wide variety of input devices, including but not limited to an external keypad, a stylus, a built-in computer mouse, and/or other devices. The mobile telephone circuitry 50 includes remote interface circuitry 52, coded circuitry 54, a controller or processor 56 and a memory 58. Individual circuits and elements are all of a type well known in the art, for example in the Nokia range of mobile telephones.

The present invention is described herein as pertaining to a network of mobile telephones 12. However, it should be understood that the present invention is not limited to mobile telephones 12 or any particular type of electronic device.

As discussed previously, there may be occasions where it is desirable to safe boot any mobile telephones 12 that exist within the mobile telephone network 11. For example, if a virus begins infecting various mobile telephones 12 within the mobile telephone network 11, an operator of the mobile telephone network 11 may decide that all mobile telephones 12 within the mobile telephone network 11 should be safe booted to prevent further infections and/or to fix problems that have resulted from an infection.

When the operator determines that one, some, or all of the mobile telephones 12 must be safe booted, an authentication centre, represented at 27 in FIG. 1, initiates a special mode of operation as discussed below. The authentication centre 27, like the mobile telephone 12, includes features such as a processor, a data communication link and a processor or controller. The operator then initiates a re-authentication of all mobiles in their network. This process is depicted in FIG. 4.

Figure 4:
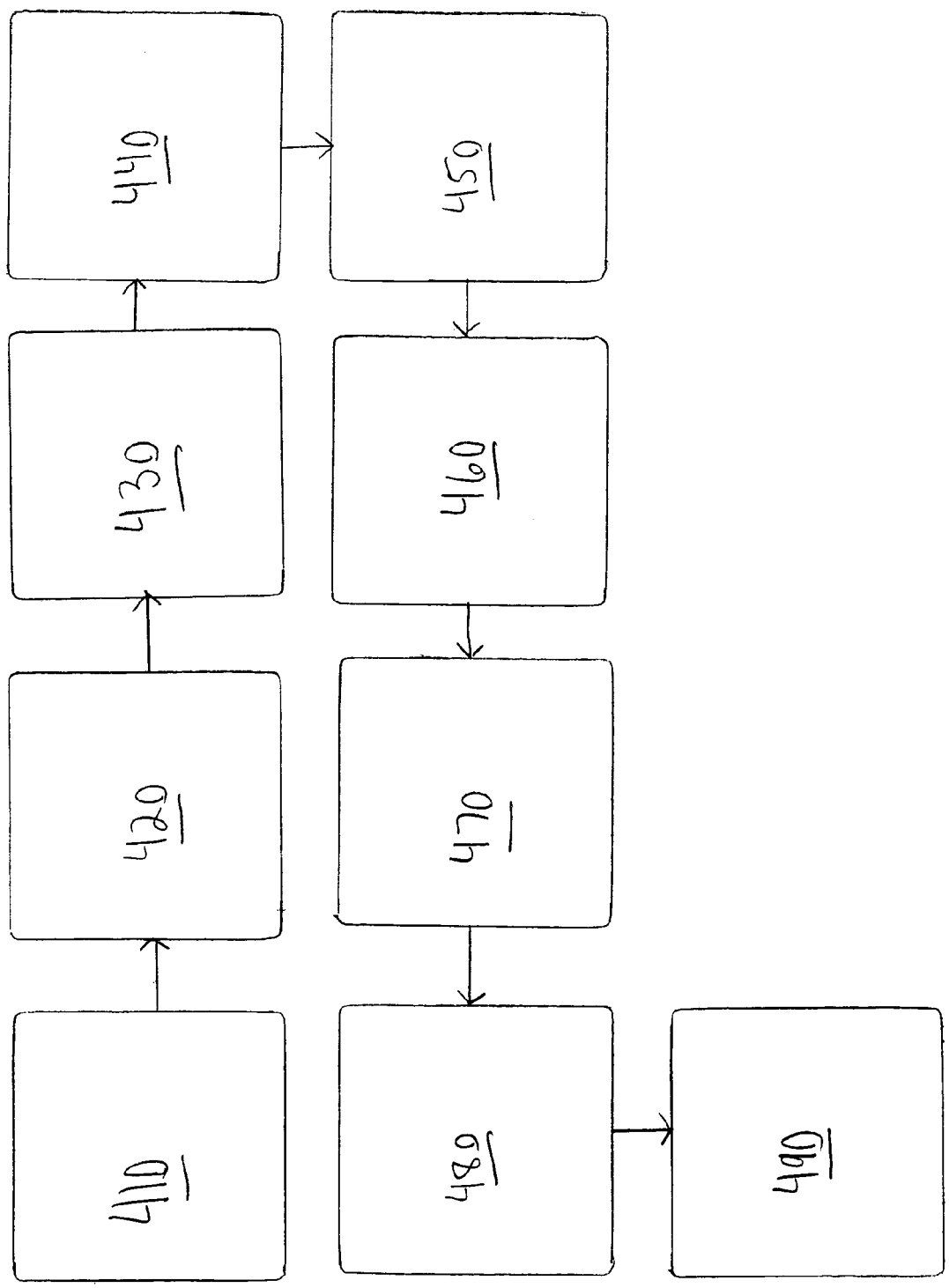
FIG. 4 is a flow chart showing the process for re-authenticating a mobile telephone using an authentication centre.

As represented at 410 in FIG. 4 the mobile telephone 12 starts authentication with the GSM network authentication centre 27. The authentication centre 27 transmits a random challenge, in the form of a 128-bit number referred to as RAND, to the mobile telephone 12 at step 420. This may also be relayed by other network elements, e.g. in a general packet radio service (GPRS) it is relayed by a Serving GPRS Support Node (SGSN).

The present invention essentially alters the meaning of RAND so that there is a specific RAND value that is never used for anything other than initiating a safe boot operation. When a compliant mobile telephone 12 receives this RAND value, the mobile telephone 12 sets an internal flag to "boot in safe mode" at step 430. The mobile telephone 12 responds with the calculated 32-bit signed response, referred to as an SRES (based upon the dummy RAND described above) at step 440, so that the authentication centre 27 knows that the special value has been received. However, the authentication centre 27 then deliberately fails the authentication at step 450, causing the mobile telephone 12 to initiate safe boot procedures at step 460. It is also possible that, before the safe boot procedure is initiated at step 460, the mobile telephone 12 could query the user regarding the upcoming procedure.

The next time that the authentication centre 27 transmits a RAND to the mobile telephone 12 at step 470, it is a "normal" RAND and the authentication process proceeds correctly, with the mobile telephone 12 transmitting an appropriate authentication response at step 480. In this situation, the authentication centre 27 recognizes that this particular mobile telephone 12 has already been issued an altered RAND, and the mobile telephone 12 knows that it should be now starting up in safe mode, which occurs at step 490.

Figure 5:
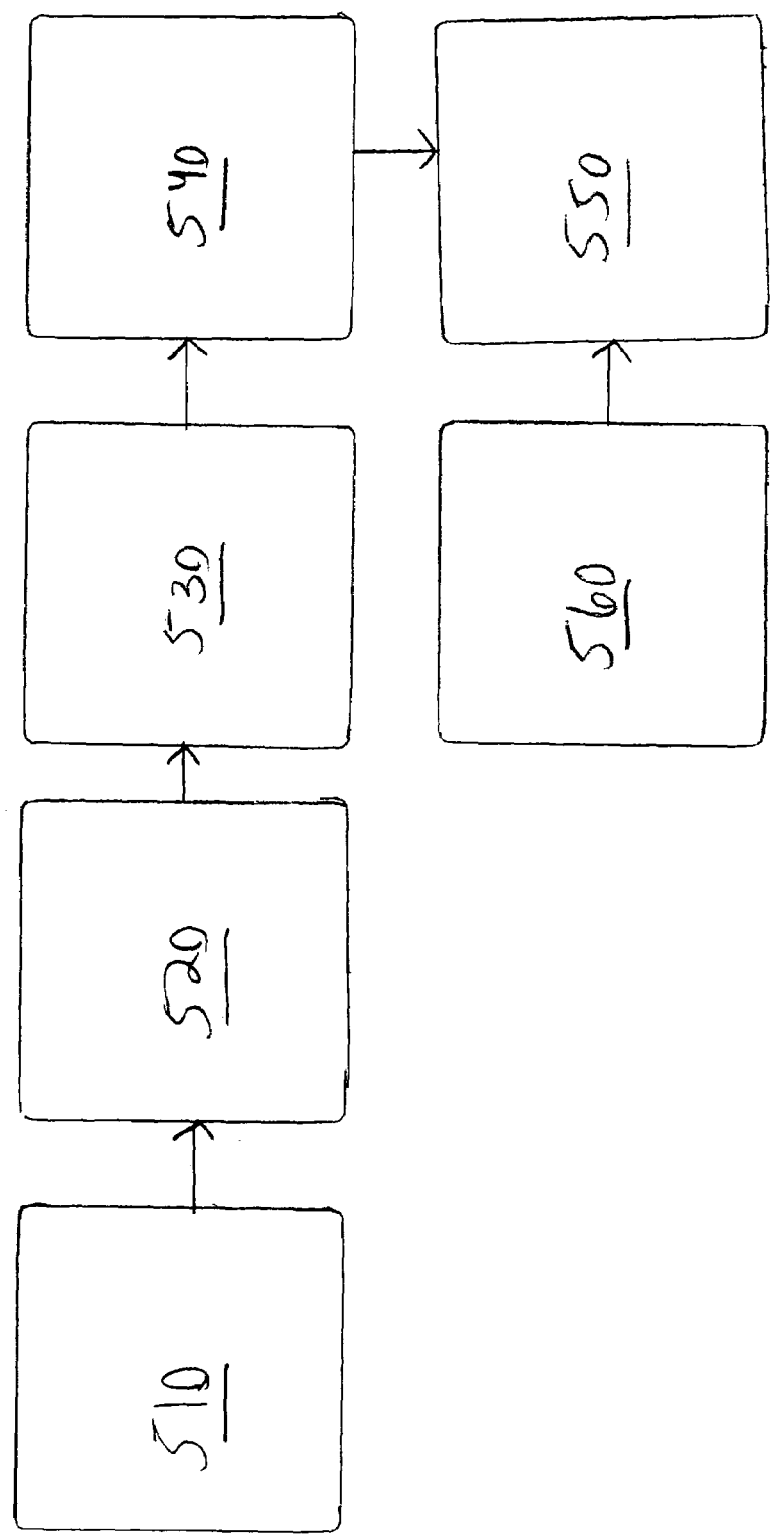
FIG. 5 is a flow chart showing the process for re-authenticating a non-compliant mobile telephone using an authentication centre.

FIG. 5 is a flow chart showing the actions that occur if the mobile telephone 12 is a non-compliant phone. If the mobile telephone 12 is a non-compliant phone, it only calculates the correct SRES response at step 510. Because the authentication centre 27 will refuse authentication at step 520, the user will receive an error message (such as "not allowed") at step 530. The user would then restart the mobile telephone 12 at step 540 and, after the restarting process has been completed at step 550, the authentication will be successful at step 560. In this manner, all mobile telephones 12 can be informed about a requirement to perform a safe boot without transmitting a message, such as a SMS messages, that might not even get through to the mobile device 12 in the first place.

The RAND/SRES authentication process is a very low-level operation in GSM systems, so the software handling the RAND/SRES authentication process can be very well-shielded from viruses and other types of "malware" and can therefore be considered "trusted." This system and method therefore provides an operator with the possibility to address all of the devices that exist on the mobile telephone network 11 without needing to know which particular devices are actually vulnerable. All of the steps required to complete this process can be implemented by computer program code stored in the memory 58 of the mobile telephone 12 and the authentication centre 27.

One issue that may arise during the implementation of the present invention is that non-compliant phones would receive one "access denied" message and, in the case of the re-authentication of currently authenticated mobile telephones 12, the re-authentication process can cause a call to be dropped. However, this issue can be resolved in a number of manners. For example, compliant mobile telephones 12 can answer the dummy RAND with a dummy SRES, indicating that they have accepted the reboot instruction and will comply. Non-compliant mobile telephones 12, on the other hand, respond with a correct SRES and will either be allowed to remain on the network (if they already were on the network when the authentication took place) or receive an "access denied" only one time (if they were switched on and were authenticated because of that). In this way, no calls need to be dropped from non-compliant mobile telephones 12.

In another embodiment of the present invention, a safe boot can also be activated and initiated by the mobile telephone 12 itself in various situations. For example, a safe boot can be activated whenever the mobile telephone 12 detects a fatal error on device user data which needs to be recovered, as well as when the mobile telephone 12 has been locked into a safe mode (e.g. an extended device lock). The lock can be set by a safe boot application to ensure proper functionality. A safe boot could also be initiated if a virus is detected during a normal use condition.

Whenever the safe boot mode is required, the whole system software may be commanded to enter into a restricted mode. The special safe boot application may then be launched to handle the functionality that is allowed in the safe mode.

According to one embodiment of the invention, when the mobile telephone 12 is in a safe mode, a number of actions occur. For example, user data drives (C:, D:, E: etc. drives) may not be mounted initially. Executable files may be loaded from ROM only. ROM-based components may not attempt to scan or read user data. For this reason, only ROM-based (factory) software settings and data files may be used to boot up the mobile device. Additionally, the mobile device may be switched to an off-line state, where communications with the network may be controlled by the safe boot application. Furthermore, a special safe boot application user interface may be initiated to handle that functionality that is possible in the safe boot mode.

Potential options that can be implemented in the safe boot mode include, but are not necessarily limited to, the mounting of user data drive(s), the formatting of user data, the uninstalling of software components, the unlocking of the mobile device from the safe mode, and the connecting of the mobile device to cellular network services.

According to the present invention, the safe boot mode can be activated in various ways. For example, but without limitation, the safe boot mode can be activated by having the network instruct the cellular software boot manager (and the whole system) to enter safe mode. As discussed above, this can be accomplished through the use of the authentication centre 27. Alternatively, the safe boot mode can be activated by any boot manager (cellular, base or system) that detects that a defined safe boot key combination has been pressed by an end-user. The safe boot mode can also be activated when any boot manager detects a fatal system failure that requires the entire system to enter safe boot mode. The safe boot mode can also be initiated when the mobile device security subsystem requires a safe boot, for example when a device lock is required.

In the Symbian software boot, there are two principal phases: the Symbian software base boot and the Symbian software system boot. Both of these phases use cellular modem software via an adaptation layer. All of the subsystems for the mobile telephone 12 need to be aware of the safe boot mode in order to offer controlled access to phone services.

Figure 6:
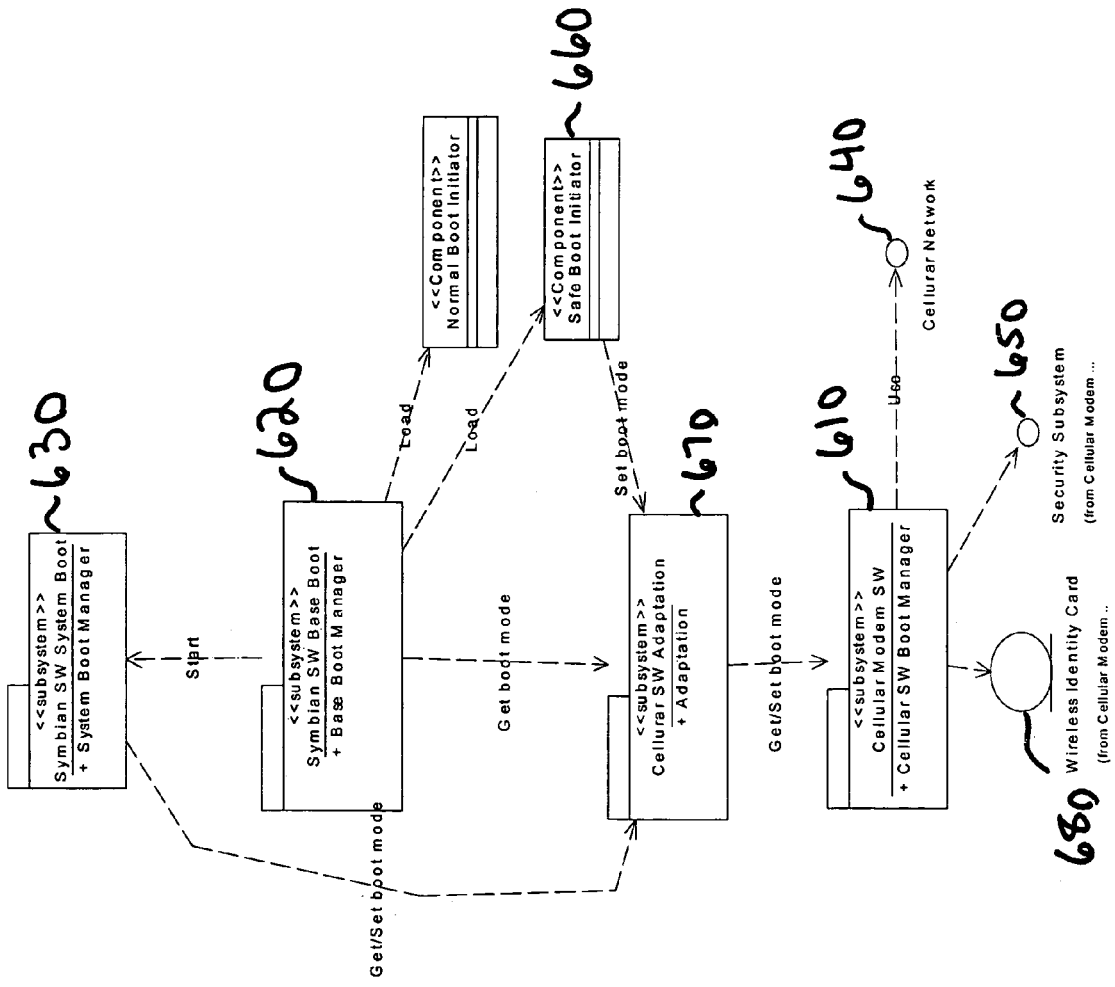
FIG. 6 is a representation of the Symbian software base boot architecture.
Figure 7:
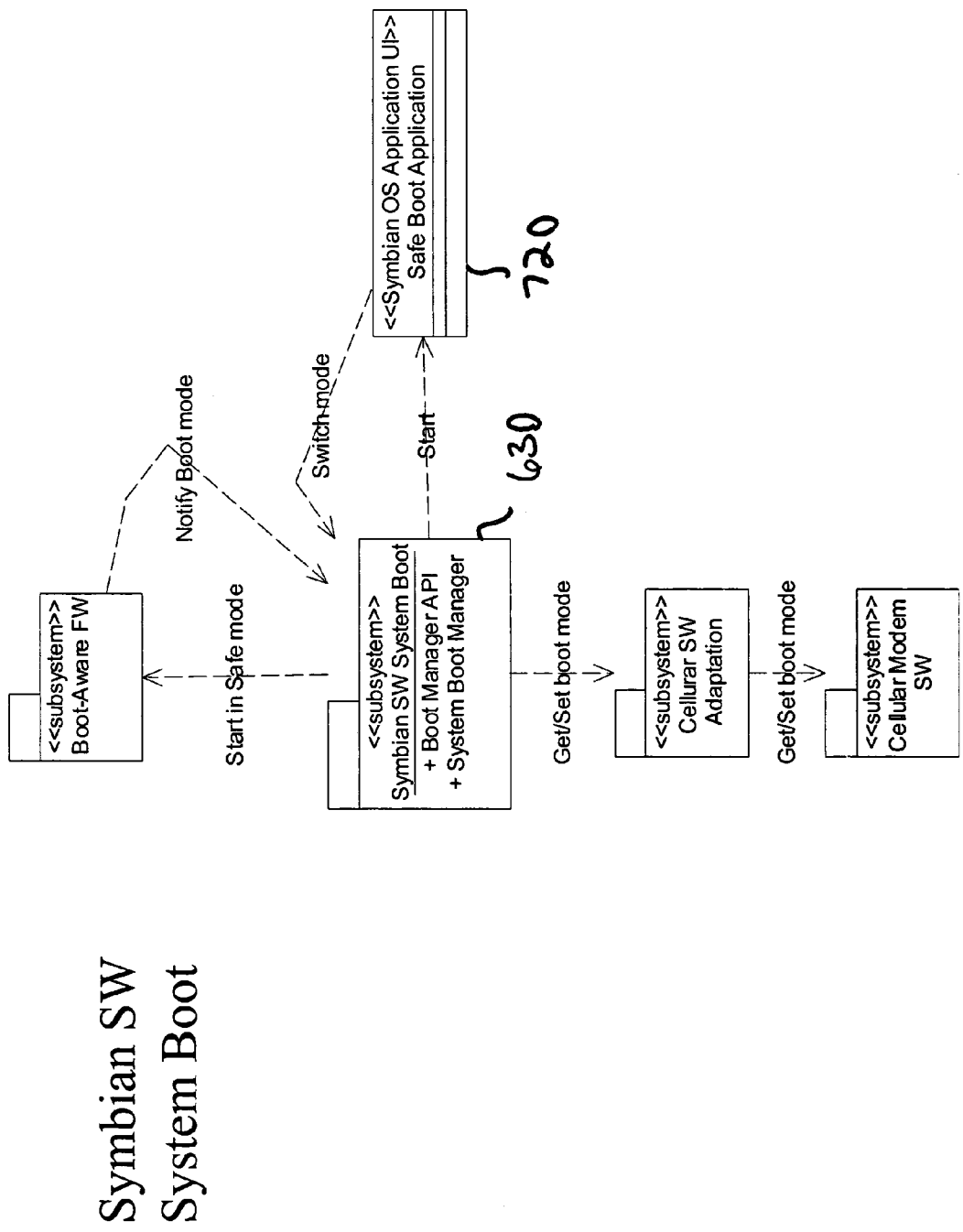
FIG. 7 is a representation of the higher level Symbian software system boot architecture.
Figure 8:
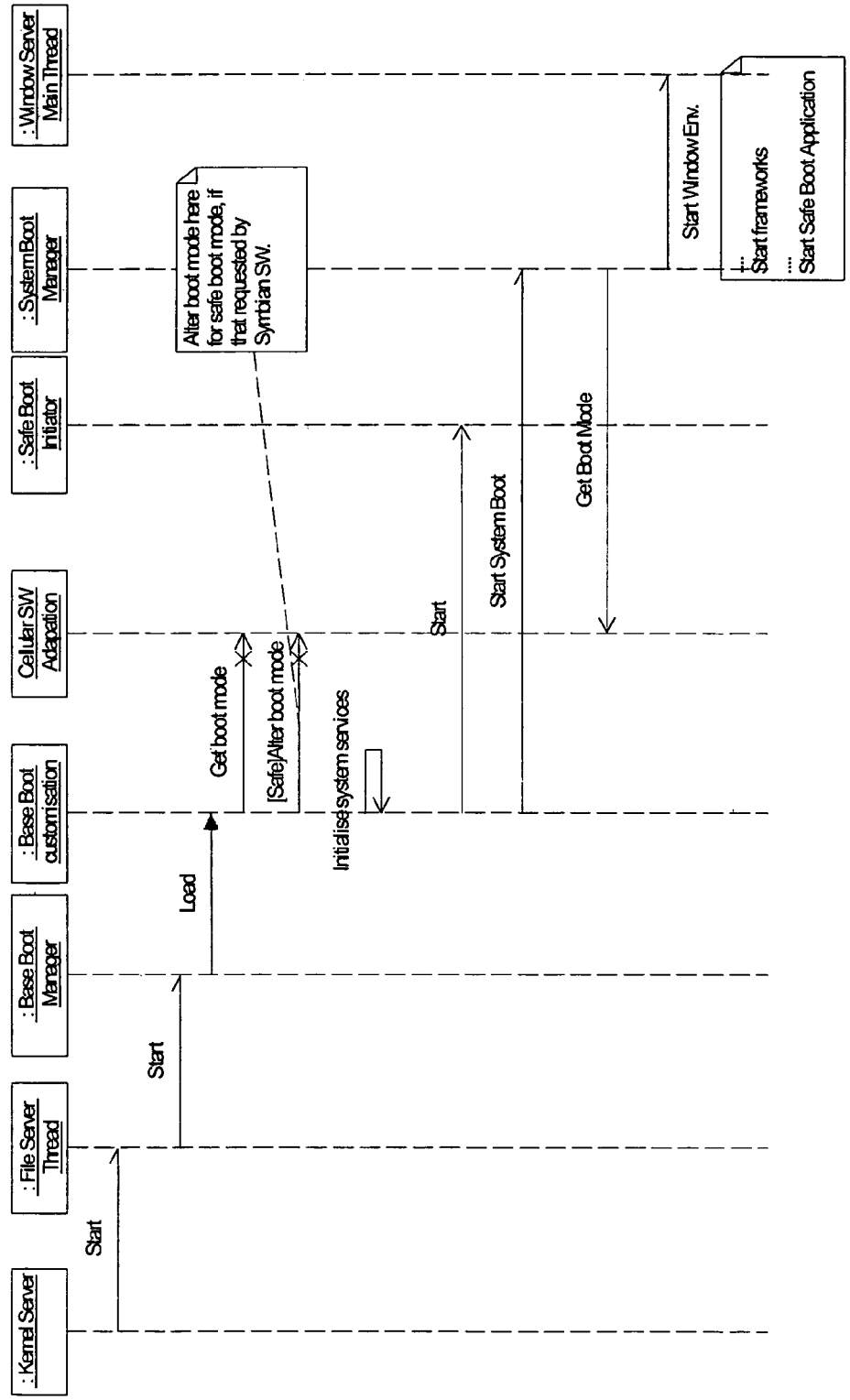
FIG. 8 is a flow chart showing a representative boot sequence according to one embodiment of the present invention.

FIGS. 6, 7 and 8 show architectural representations of how a device enters a safe boot mode. Architecturally, to support a safe boot means ensuring that both the base boot and the system boot know that a safe boot has been requested by the cellular modem software. FIG. 6 shows the Symbian software base boot architecture, and FIG. 7 shows the higher level Symbian software system boot architecture. FIG. 8 shows a general, simplified boot sequence.

In the Symbian software base boot architecture of FIG. 6, the key architectural subsystems are the cellular modem software 610, the Symbian software base boot 620, and the Symbian software system boot 630. The cellular modem software 610 controls the cellular network 640 and device security subsystems 650 such as SIM locks and device locks. The cellular modem software 610 has its own cellular software boot manager which wakes up necessary services for the Symbian software.

The Symbian software base boot 620 has a base boot manager which takes care of the Symbian software-side low-level (base) startup. The base boot manager also synchronizes the boot including mode with the cellular modem boot manager 610. The Symbian software base boot manager retrieves the boot mode information from the cellular software boot manager 610 via an adaptation layer 670. In the safe mode, the Symbian software base boot manager activates a safe boot initiator 660 which initiates the Symbian base software (e.g., the file manager, kernel, etc.) into the proper mode. The Symbian software base boot manager then starts the Symbian software system boot 630 which wakes up the high-level frameworks, such as the telephony application, application shell, etc., and other applications offering user interfaces to the end user. In the safe mode, the special safe boot applications are launched to handle the issue.

In the higher-level Symbian software system boot architecture of FIG. 7, the Symbian software system boot 630 starts all boot-aware high-level frameworks into the safe mode. The framework can be an application user interface, a server process, a hardware device driver, or any software entity that needs to be started upon boot. The system boot manager starts the necessary key frameworks, such as telephony and system frameworks, into safe mode first. One special component that is started later in the process is the safe boot application 720. The safe boot application 720 initially offers a visible user interface to the end user to display functionality that is only available in the safe mode. This functionality can include, but is not necessarily limited to, the uninstalling applications to eliminate malicious applications; the formatting of user data to recover from corrupt data errors; and the unlocking of the mobile device from the safe mode.

The safe boot application may offer the option of switching to the normal mode, and the started frameworks can listen to mode changes. Therefore, the system boot manager of the present invention offers an application programming interface (API) for the frameworks to switch modes and to obtain notifications from boot mode changes caused by the safe boot application.

As mentioned above, FIG. 8 is a representation of a simplified boot sequence that is used to start system boot manager up and running in the safe mode. The base boot manager may alter the boot mode to "safe" when needed.

Figure 9:
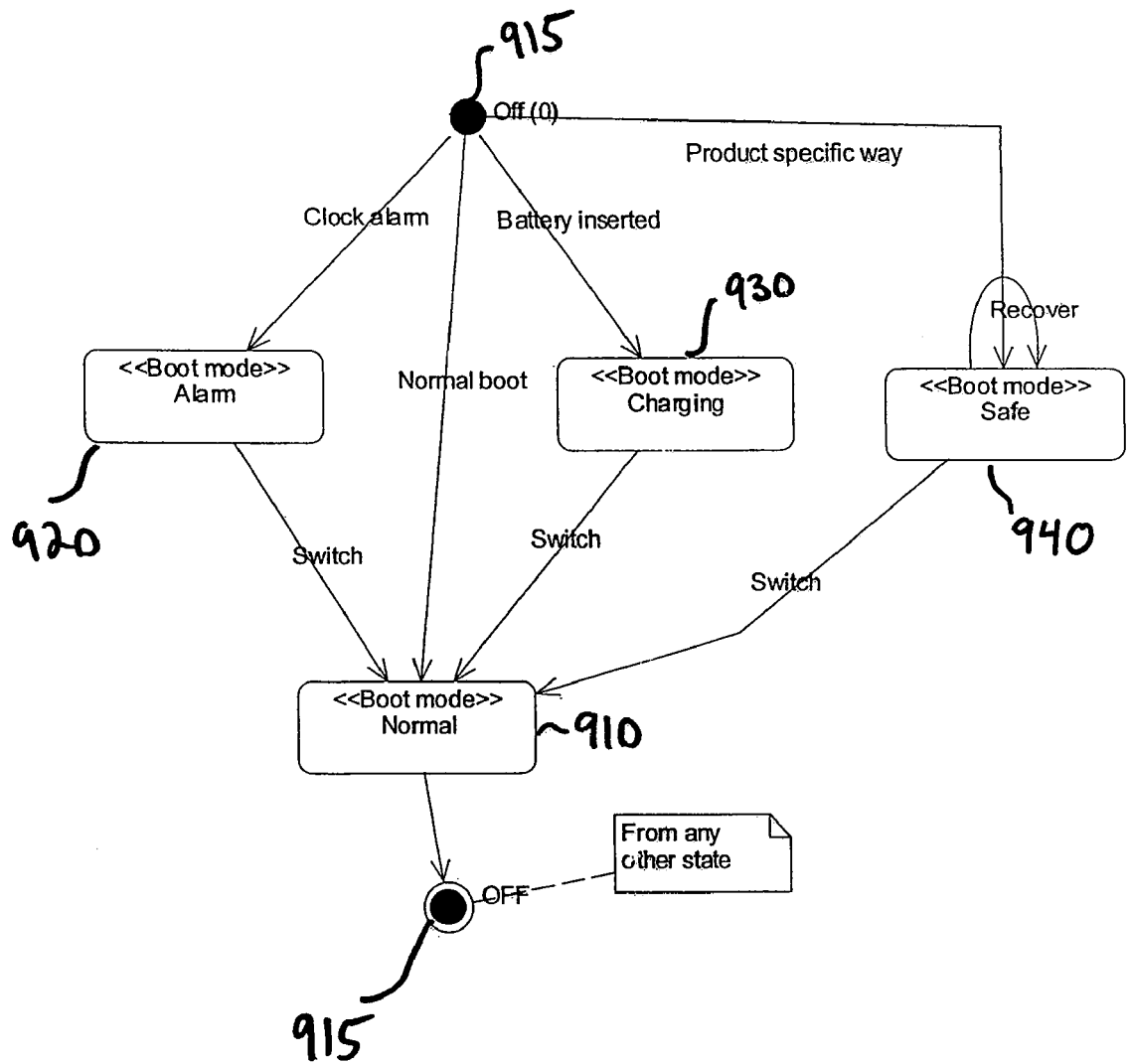
FIG. 9 is a diagram showing the relationship between various boot modes.

FIG. 9 is a representation of the various boot modes available according to one embodiment of the present invention. The mobile device has various boot modes to reflect different use situations. In a normal mode 910, the mobile telephone 12 is started when the end user simply actuates the power button or key when the device is in an "off" position 915. In an "alarm" mode 920, the mobile telephone 12 is started when a set clock alarm activates when the mobile telephone 12 is in the off position 915. In a "charging" mode 930, the mobile telephone 12 is started when a charger is connected to the mobile telephone 12 when the mobile telephone 12 is in the off position 915. In the safe mode 940 and as discussed earlier, the mobile telephone 12 is booted into the safe mode 940. According to one embodiment of the invention, the method for entering the safe mode 940 is specified by mobile device manufacturer, e.g. by actuating a pre-defined key combination on the keypad 34 pressed during the boot process. In some devices, the safe mode 940 can also be entered into by pressing a specified, inlaid button using a stylus, pencil or similar instrument. In the safe mode 940, the safe boot application offers recovery actions to the end user and allows optional switching back to the normal mode 910.

In an alternate embodiment of the invention, any boot manager (e.g., the cellular, base, or system boot manager) that detects special accessory hardware (such as a MMC card, a RFID based device, etc.) that requires the entire system to enter the safe boot mode can instruct the mobile device to enter the safe boot mode. Furthermore, a wireless identity card (such as a SIM lock), represented at 680 in FIG. 6, could also cause the whole system to enter the safe mode 915.

While several embodiments have been shown and described herein, it should be understood that changes and modifications can be made to the invention without departing from the invention in its broader aspects. For example, but without limitation, although the present invention may be particularly useful for mobile telephones 12 that have very limited anti-virus capabilities, the present invention can be incorporated into virtually any type of electronic device that resides within a network, regardless of whether the device is a mobile telephone 12, another type of mobile electronic device, or a type of non-mobile electronic device. Additionally, although present invention as described herein refers to Symbian software, other software/operating systems could also incorporate the principal features of the present invention. The present invention can be incorporated into mobile telephones that have WLAN capabilities, such as the Nokia 9500 series of mobile telephones. Furthermore, a safe boot operation according to the present invention could also be initiated by corporate security systems via a virtual private network (VPN) or by transmitting an instruction to operators that all corporate phones must be safe-booted. In one alternative embodiment of the invention, the safe-boot could be initiated through an RFID or Bluetooth device. This embodiment could be used in, for example, corporate networks. As an exemplary use of this embodiment, the following situation can be considered: When a visitor arrives into the corporate building, his/hers phone could be forced to safe-boot in the reception area. As a consequence, the visitor could be prevented from running any $3^{rd}$ part application in the corporate network. Various features of the invention are defined in the following Claims:

What is claimed is:

1. A method, comprising:
 receiving by an electronic device at least one first authentication request sent from a remote terminal, said authentication request including an instruction to initiate a safe boot procedure; and
 at least partly in response to receiving the at least one first authentication request, entering a restricted mode, wherein the restricted mode causes a processor within the electronic device to execute only trusted software stored within the electronic device prior to receiving the first authentication request.

2. The method of claim 1, wherein entering the restricted mode includes:
 transmitting to the remote terminal at least one response authentication signal in response to the at least one first authentication request; and
 at least partly in response to the remote terminal failing to authenticate the at least one response authentication signal, configuring the electronic device to operate in the restricted mode.

3. The method of claim 2, wherein the at least one response authentication signal comprises at least a 32-bit signed response.

4. The method of claim 2, wherein entering the restricted mode includes: receiving by the electronic device at least one second authentication request from the remote terminal;
 transmitting at least one second authentication response to the remote terminal; and
 starting operation of the electronic device in the restricted mode in response to the remote terminal authenticating the at least one second authentication response.

5. The method of claim 1, wherein the electronic device comprises a mobile telephone.

6. The method of claim 1, wherein the at least one first authentication request is in the form of a random challenge value comprising a predefined value for initiating the restricted mode.

7. The method of claim 6, wherein entering the restricted mode includes:
 receiving by the electronic device at least one second authentication request from the remote terminal; wherein the at least one second authentication request is in the form of a random challenge value comprising a generic random challenge value; transmitting at least one second authentication response to the remote terminal; and
 starting operation of the electronic device in the restricted mode in response to the remote terminal authenticating the at least one second authentication response.

8. The method of claim 1, further comprising:
 before entering the restricted mode, querying a user of the electronic device about entering the restricted mode.

9. A computer-readable storage medium storing instructions that, when executed by a computer, cause the computer to perform as follows:
 receiving by an electronic device at least one first authentication request sent from a remote terminal; and
 at least partly in response to receiving the at least one first authentication request, entering a restricted mode, wherein the restricted mode causes a processor within the electronic device to execute only trusted software stored within the electronic device prior to receiving the first authentication request.

10. The computer-readable storage medium of claim 9, further storing instructions that, when executed by a computer, cause the computer to perform as follows:
 transmitting to the remote terminal at least one response authentication signal in response to the at least one first authentication request; and
 at least partly in response to the remote terminal failing to authenticate the at least one response authentication signal, configuring the electronic device to operate in the restricted mode.

11. The computer-readable storage medium of claim 9, wherein entering the restricted mode includes: transmitting to the remote terminal at least one response authentication signal in response to the at least one first authentication request, wherein the at least one first authentication request is in the form of a random challenge comprising a predefined value for initiating the restricted mode;

receiving by the electronic device at least one second authentication request from the remote terminal, wherein the at least one second authentication request is in the form of a random challenge comprising a generic random challenge value;

transmitting at least one second authentication response to the remote terminal; and starting operation of the electronic device in the restricted mode in response to the remote terminal authenticating the at least one second authentication response.

12. The computer-readable storage medium of claim 9, further storing instructions that, when executed by a computer, cause the computer to perform as follows: initiating a safe boot operation in response to actuation of a predesignated key combination by the user.

13. The computer-readable storage medium of claim 9, further storing instructions that, when executed by a computer, cause the computer to perform as follows: initiating a safe boot operation in response to a detection of a fatal system failure.

14. The computer readable storage medium of claim 13, wherein the fatal system failure is detected by a device selected from the group consisting of a base boot manager and a system boot manager.

15. The computer-readable storage medium of claim 9, further storing instructions that, when executed by a computer, cause the computer to perform as follows: before initiating the safe boot procedure, querying a user of the electronic device about the upcoming safe boot procedure.

16. A system, comprising:
an electronic device; and
a remote terminal configured to communicate with the electronic device, the remote terminal being configured to transmit at least one first authentication request to the electronic device, and wherein the electronic device is configured to, after the remote terminal transmits the at least one first authentication request, initiate a safe boot procedure, wherein the safe boot procedure causes a processor within the electronic device to execute only trusted software stored within the electronic device prior to receiving the first authentication request.

17. The system of claim 16, wherein the electronic device is configured to, in response to the transmission of the at least one first authentication request, set at least one internal flag on the electronic device indicating that the electronic device should boot in a safe mode, and wherein the remote terminal is configured to fail to authenticate at least one response authentication signal from the electronic device, causing the electronic device to at least partly initiate a safe boot procedure on the electronic device.

18. The system of claim 16, wherein the at least one response authentication signal comprises a 32-bit signed response.

19. The system of claim 16, wherein the electronic device comprises a mobile telephone.

20. The system of claim 16, wherein the remote terminal comprises a cellular network authentication center within the network.

21. The system of claim 16, wherein, before the safe boot procedure is initiated, the remote terminal is configured to query a user of the remote terminal about the upcoming safe boot procedure.

22. An apparatus, comprising:
a processor; and
memory having stored therein computer readable instructions that, when executed by the processor, causes the apparatus to perform the following:
receiving by the apparatus at least one first authentication request from a remote terminal, and
at least partly in response to receiving the at least one first authentication request, entering a restricted mode, wherein the restricted mode causes the processor within the apparatus to execute only trusted software, wherein the trusted software is stored within the apparatus prior to receiving the first authentication request.

23. The apparatus of claim 22, wherein entering the restricted mode includes:
transmitting to the remote terminal at least one response authentication signal in response to the at least one first authentication request; and
at least partly in response to the remote terminal failing to authenticate the at least one response authentication signal, configuring the apparatus to operate in the restricted mode.

24. The apparatus of claim 23, wherein the at least one response authentication signal comprises a 32-bit signed response.

25. The apparatus of claim 22, wherein at least a portion of the trusted software is pre-stored on read-only memory.

26. The apparatus of claim 22, wherein the at least one first authentication request is in the form of a random challenge comprising a predefined value for initiating the restricted mode.

27. The apparatus of claim 22, wherein the memory further has stored therein computer readable instructions that, when executed by the processor, causes the apparatus to further perform:
before entering the restricted mode, querying a user of the electronic device about entering the restricted mode.

28. An apparatus, comprising:
a processor, configured to perform the following;
determine that a remote electronic device should be set to safe mode;
in response to the determination, transmit at least one authentication request with a challenge value to the remote electronic device, the challenge value being predetermined to fail the authentication;
receiving from the remote electronic device at least one response authentication signal in response to the at least one authentication request; and
rejecting the authentication.

29. The apparatus claim 28, wherein the at least one authentication request comprises a safe-boot-specific random challenge.

30. The apparatus of claim 28, wherein the at least one response authentication signal comprises a 32-bit signed response.

31. The apparatus of claim 28, wherein the remote terminal comprises a global system for mobile communications network authentication centre.

32. The apparatus of claim 28, wherein the remote electronic device comprises a Serving general packet radio service Support Node.

33. The apparatus of claim 28, wherein the remote terminal comprises a radio frequency identification device.

34. The apparatus of claim 28, wherein the at least one authentication request is sent over wireless local area network connection.

35. A computer readable medium, storing computer-executable instructions that, when executed by a computer, cause the following to occur:
  determining that a remote electronic device should be set to a safe mode;
  in response to the determination, transmitting at least one authentication request with a challenge value to the remote electronic device, the challenge value being predetermined to fail the authentication;
  receiving from the remote electronic device at least one response authentication signal in response to the at least one authentication request; and
  rejecting the authentication

36. The computer readable medium of claim 35, wherein the authentication request comprises a safe-boot-specific random challenge.

37. The computer readable medium of claim 35, wherein the at least one response authentication signal comprises a 32-bit signed response.

* * * * *